3,109,869
PROCESS FOR DIMERIZING OLEFINS
Robert R. Chambers and Robert A. Sanford, Homewood, Seymour H. Patinkin, Chicago, and Robert L. Foster, Homewood, Ill., assignors, by mesne assignments, to Sinclair Research, Inc., New York, N.Y., a corporation of Delaware
No Drawing. Filed Apr. 9, 1958, Ser. No. 727,252
4 Claims. (Cl. 260—683.15)

This invention relates to the dimerization of close boiling $C_6$ to $C_{16}$ olefin cuts derived from $C_3$ to $C_4$ olefins to produce good yields of relatively close boiling mono-olefins of 12 to 32 carbon atoms. More specifically, this invention is concerned with the dimerization with sulfuric acid of close cut $C_6$ to $C_{16}$ olefin fractions produced in the polymerization of $C_3$ and $C_4$ olefins.

Mono-olefins of 12 to 32 carbon atoms are particularly useful in the alkylation of aromatics to form stocks suitable for sulfonation and ultimate use as detergents or oil-soluble sulfonates. These olefins are also useful in the alkylation of phenols. For the olefins to be suitable for these and other uses, it is highly desirable that they have narrow boiling-point and molecular-weight ranges. Of course, they must also be derived from relatively low cost starting materials.

There have been attempts to obtain the $C_{12}$ to $C_{32}$ olefins from the abundant $C_3$ to $C_4$ olefins. If these long chained olefins be obtained by single-stage polymerization of $C_3$ and $C_4$ olefins, the products have a wide boiling point range, and thus their molecular-weight ranges vary too widely. In addition, low conversion to the desired molecular weight range is obtained. It has also been proposed to obtain olefins within the $C_{12}$ to $C_{32}$ range by two-stage processes involving polymerization to the $C_6$ to $C_{16}$ range with subsequent polymerization by sulfuric acid. Here again, relatively broad boiling range products are obtained (see U.S. Patent No. 2,670,392).

In the present invention, we have found a method of producing good yields of $C_{12}$ to $C_{32}$ olefins of relatively close boiling range from low cost $C_3$ and $C_4$ olefins, provided certain process limitations be observed. In our process, the feed stock, which is $C_6$ to $C_{16}$ mono-olefin, can be derived by either a selective or a non-selective polymerization of $C_3$ and $C_4$ olefins.

A close cut of the olefin within the $C_6$ to $C_{16}$ range having a boiling range which is equivalent of up to about 30° C., preferably up to about 15° C., at atmospheric pressure is taken and contacted with not greater than a total of about 5.0 volume percent of sulfuric acid based on the olefin feed. Preferably, the total amount of acid employed is no more than about 2 volume percent based on the olefin feed, and usually at least about 0.5 volume percent of acid is employed to get an adequate conversion. The strength of the sulfuric acid is at least about 75 weight percent, preferably about 95 weight percent or more. The pressure maintained during the polymerization is preferably atmospheric but is sufficient to maintain the reacting olefin in the liquid phase. The temperature during most of the addition of the acid can with advantage be maintained at not more than about 50° C., preferably not more than about 25° C. Generally, the temperature will not be below about −10° C. and usually is at least about 0° C. The dimerization is preferably conducted on closely cut $C_6$ to $C_{12}$ fractions to produce mono-olefins of 12 to 24 carbon atoms.

As noted, one of the essential conditions of the polymerization reaction is that the total amount of acid utilized must not exceed about 5 volume percent, preferably about 2 volume percent, based on the olefin feed. The acid may be added all at once or in several portions, for instance while withdrawing the spent acid layer before each successive addition; but in no case should the total acid employed exceed about 5 volume percent of the olefin feed.

The source of olefin for our polymerization is important, not only from the economic standpoint, but also from consideration of chemical structure. As noted, the mono-olefin feed cut has no more than about the equivalent of a 30° C. boiling range at atmospheric pressure and has about 6 to 16 carbon atoms, preferably 6 to 12 carbon atoms. To be successful in the polymerization reaction, the olefins must also be branched chains of the type obtained from the polymerization of $C_3$ to $C_4$ mono-olefins. To obtain a broad range of olefins from which the dimerization feed is cut, the $C_3$ to $C_4$ olefins can be polymerized selectively or non-selectively. In the most convenient process, the olefins are polymerized non-selectively by a reaction at 150 to 1200 p.s.i. at 175 to 260° C. in the presence of a solid phosphoric acid catalyst. Of course, for our purposes, the method of polymerizing the $C_3$ and $C_4$ olefins is immaterial as long as it affords a product within the desired boiling range or a product from which the desired cut for the polymerization can be separated.

When conducting the polymerization of the $C_3$ and $C_4$ olefins, either selectively or non-selectively, we prefer to pass them over a solid phosphoric acid catalyst at about 175 to 235° C. at pressures from about 450 to 550 p.s.i. and space velocities (gallons total feed per pound of catalyst per hour) of about 0.4 to 0.6. These reaction conditions are particularly effective with propane-propylene and butane-butylene streams containing upwards of about 50 percent olefins. Under these conditions, conversions of about 91 percent of $C_6$ to $C_{16}$ polymers are obtained. Subsequent fractionation of the polymer product gives the material to be dimerized according to our invention.

It is also desirable that the olefin feed material to be dimerized be substantially free of peroxides and/or other oxygenated impurities. Peroxides and other oxygenated impurities in the olefin feed are found to inhibit dimerization, probably by complexing with the acid catalyst, and for that reason, should be avoided to obtain the most advantageous results.

The following table represents typical product distribution from selective and non-selective polymerization of $C_3$ and $C_4$ olefins as described.

TABLE I

| Type of Polymerization | Non-Selective | Selective (Propylene) |
|---|---|---|
| Percent Olefin in the Feed | 51.3 | 50.5 |
| Conversion, Wt. percent | 91.5 | 90.9 |
| Boiling Range of Product, ° F | 112–425 | 104–438 |
| Product Distribution, Volume percent | { 89.5 ($C_6$–$C_{10}$)<br>10.5 ($C_{11}$–$C_{16}$) | { 66.2 ($C_6$–$C_{10}$)<br>30.4 ($C_{11}$–$C_{12}$)<br>3.4 ($C_{13}$–$C_{16}$) |
| Total | 100.0 | 100.0 |

The following examples illustrate our dimerization reaction but they are not to be considered limiting.

*Example I*

A one-liter four-necked flask equipped with a motor driven stirrer was charged with 450 ml. (318 grams) of a selective $C_7$ cut from mixed $C_3$ and $C_4$ olefins. The polymer cut had a boiling range of 87.7° to 95.5° C. and was composed of 99.0 percent of $C_7$ olefin. The dimerization reaction was effected by addition to the flask of 2 volume percent (16.7 grams) of 96 percent $H_2SO_4$. All the acid was added at once while maintaining the temperature during acid addition at about 24 to 38° C. For purposes of comparison, similar volumes of the $C_7$ polymer were dimerized using 4, 6 and 10 total volume percents of 96 percent sulfuric acid.

The results are illustrated in Table II below:

TABLE II

| Run | I | II | III | IV |
|---|---|---|---|---|
| Feed: | | | | |
| Weight (g.) | 318 | 318 | 318 | 317 |
| Volume (ml.) | 450 | 450 | 450 | 450 |
| Peroxide No. | 2.9 | 2.9 | 2.9 | 2.9 |
| $H_2SO_4$ (approx. 96%): | | | | |
| Weight (g.) Total | 16.7 | 32.5 | 48.3 | 80.7 |
| Vol. percent ea. acid addition | 2 | 2 | 2 | 10 |
| No. of acid additions [1] | 1 | 2 | 3 | 1 |
| Total vol. percent acid used | 2 | 4 | 6 | 10 |
| Conditions: | | | | |
| Temperature, ° C. during acid addition | 24–38 | 24–38 | 24–38 | 25–41 |
| Time (total, Hrs.) | 1 | 2 | 3 | 1 |
| Stirring speed (r.p.m.) | ~1,750 | ~1,850 | ~1,850 | 1,800 |
| Conversion | 84 | 88 | 91 | 92 |
| Product recovery: | | | | |
| Weight (g.) | 267 | 264 | 252 | 236 |
| Weight percent on Feed | 84 | 83 | 79 | 74 |
| 5 Ml. Distillation (percent overhead): | | | | |
| IBP–200° C. (monomer) | 19 | 14 | 11 | 10 |
| 200–240° C. (dimer) | 70 | 62 | 53 | 31 |
| >240° C. (higher polymer) | 11 | 24 | 36 | 59 |
| Dimer: | | | | |
| Yield [2] (Wt. percent) | 59 | 52 | 42 | 23 |
| Percent Selectivity [2] | 70 | 58 | 46 | 25 |

[1] Acid layer removed before each addition when plural additions were used.
[2] Based on actual recoveries.

*Example II*

A one-liter four-necked flask equipped with a motor driven stirrer was charged with 150 ml. (107 grams) of a $C_8$ cut of a selective polymer from mixed $C_3$ and $C_4$ olefins. The polymer had a boiling point range of 108° to 115.5° C. and was composed of 97 weight percent of $C_8$ olefins. The dimerization was effected by addition of 2 volume percent (5.3 grams) of 96 percent $H_2SO_4$. All the acid was added at one time while maintaining the temperature during the addition at about 0±3° C. The total reaction time was one hour.

For purposes of comparison similar volumes of the $C_8$ cut were dimerized using (1) a total of 2 volumes percent of 96 percent $H_2SO_4$ whereby the temperature during acid addition was about 25 to 45° C. and (2) a total of 10 volume percent of 96 percent $H_2SO_4$, based on the olefin feed. The results are shown in Table III below.

*Example III*

A one-liter four-necked flask equipped with a motor driven stirrer was charged with 450 ml. (326 grams) of a $C_8$ cut of a selective polymer from mixed $C_3$ and $C_4$ olefins.

TABLE III

| Run | I | II | III | IV | V | VI |
|---|---|---|---|---|---|---|
| Feed: | | | | | | |
| Weight (g.) | 107 | 108.5 | 108 | 326 | 326 | 326 |
| Volume (ml.) | 150 | 150 | 150 | 450 | 450 | 450 |
| Peroxide No. | 1.6 | 1.6 | 1.6 | 1.4 | 1.4 | 1.4 |
| $H_2SO_4$ (approx. 96%): | | | | | | |
| Weight (g.) Total | 5.3 | 5.6 | 26.6 | 16.9 | 34.6 | 57.2 |
| Vol. percent ea. acid addition | 2 | 2 | 10 | 2 | 2, 2.2 | 2, 2.2, 2.8 |
| No. of acid additions [a] | 1 | 1 | 1 | 1 | 2 | 3 |
| Total vol. percent acid used | 2 | 2 | 10 | 2 | 4.2 | 7 |
| Conditions: | | | | | | |
| Temperature, ° C., during acid addition | 0±3 | 25–43 | 24–39 | 24–37 | 30–35 | 26–30 |
| Time (total, hrs.) | 1 | 1 | 1 | 1 | 2 | 3 |
| Stirring Speed (r.p.m.) | 2,050 | 2,100 | 2,050 | 2,100 | 2,100 | 2,100 |
| Conversion [a] | 87 | 72 | 90 | 83 | 92 | 93 |
| Product Recovery: [b] | | | | | | |
| Weight (g.) | 90 | 92.5 | 83.5 | 267 | 236 | 218 |
| Weight percent on Feed | 84 | 85 | 77 | 83 | 73 | 67 |
| 5 Ml. Distillation (percent overhead): | | | | | | |
| IBP–220° C. (monomer) | 15 | 33 | 13 | 21 | 12 | 11 |
| 220–260° C. (dimer) | 69 | 60 | 38 | 66 | 60 | 46 |
| >260° C. (higher polymer) | 16 | 7 | 49 | 13 | 28 | 43 |
| Dimer: | | | | | | |
| Yield (Wt. percent) [c] | 58 | 51 | 29 | 54 | 43 | 31 |
| Percent Selectivity [c] | 67 | 71 | 32 | 65 | 47 | 33 |

[a] Acid layer removed before each addition when plural additions were used.
[b] After washing and drying.
[c] Based on actual recoveries.

The polymer had a boiling range of 106.2 to 116° C. and was composed of 98.6 percent $C_8$ olefins. The dimerization was effected by addition of a total of 2 volume percent (16.9 grams) of 96 percent $H_2SO_4$. All the acid was added at one time while maintaining the temperature during the addition to about 24–37° C.

Using similar volumes of the $C_8$ cut, two additional dimerizations were conducted, one employing a total of 4.2 volume percent of 96 percent $H_2SO_4$, the other a total of 7 volume percent. The results of Example III are also shown in Table III.

Examination of the data in Tables II and III shows that the best selectivity and yields were obtained using a total of not more than about 5 volume percent of $H_2SO_4$ based on the olefin feed, preferably a total of about 2 volume percent of $H_2SO_4$. The selectivity (based on actual recoveries) to dimer fell from about 65 to 71 percent with 2 volume percent acid to about 25–32 percent with 10 volume percent acid. In addition, Table III demonstrates the role of temperature during acid addition in regard to the conversion and yield of dimer obtained with a given amount of acid. Higher conversion and yield were obtained at a temperature of 0 ± 3° C. than at a temperature of about 25–43° C.

We claim:

1. In a method for producing a close-boiling olefin dimer fraction in the $C_{12}$ to $C_{32}$ range, the steps comprising contacting in the liquid phase a close cut mono-olefin fraction in the $C_6$ to $C_{16}$ range, said cut having a boiling point range up to about 30° C., and derived from the polymerization of $C_3$ to $C_4$ olefins, with not more than a total of about 5 volume percent of sulfuric acid based on the olefin feed, said sulfuric acid being of at least about 75 percent strength.

2. The method of claim 1 in which the olefin feed is in the $C_6$ to $C_{12}$ range and has a boiling point range up to about 15° C. and the dimer product is in the $C_{12}$ to $C_{24}$ range.

3. In a method for producing a close-boiling olefin dimer fraction in the $C_{12}$ to $C_{32}$ range, the steps comprising contacting in the liquid phase at a temperature of not more than about 25° C., a close cut mono-olefin fraction in the $C_6$ to $C_{16}$ range, said cut having a boiling point range up to about 15° C. and derived from the polymerization of $C_3$ to $C_4$ olefins, with not more than about 2 volume percent of sulfuric acid based on the olefin feed, said sulfuric acid being of at least about 95 percent strength.

4. The method of claim 3 in which the olefin feed is in the $C_6$ to $C_{12}$ range and the dimer product is in the $C_{12}$ to $C_{24}$ range.

References Cited in the file of this patent

UNITED STATES PATENTS

| | | |
|---|---|---|
| 2,258,368 | Stevens et al. | Oct. 7, 1941 |
| 2,472,494 | Slotterbeck | June 7, 1949 |
| 2,572,724 | Hinds et al. | Oct. 23, 1951 |
| 2,670,392 | Glassmire et al. | Feb. 23, 1954 |